(12) United States Patent
Saunders

(10) Patent No.: US 12,433,437 B1
(45) Date of Patent: Oct. 7, 2025

(54) LAZY SUSAN

(71) Applicant: Gracie Saunders, Saxe, VA (US)

(72) Inventor: Gracie Saunders, Saxe, VA (US)

( * ) Notice: Subject to any disclaimer, the term of this patent is extended or adjusted under 35 U.S.C. 154(b) by 0 days.

(21) Appl. No.: 18/650,356

(22) Filed: Apr. 30, 2024

(51) Int. Cl.
*A47G 23/08* (2006.01)
*A47G 23/06* (2006.01)

(52) U.S. Cl.
CPC .......... *A47G 23/08* (2013.01); *A47G 23/06* (2013.01)

(58) Field of Classification Search
CPC ...... A47G 23/08; A47G 23/06; A47G 19/022; A47G 19/30; A47G 23/0633
USPC ....... 211/78, 163, 70, 14, 85.4; 99/483, 484; D7/555–557; 206/514, 564, 558, 562; 220/23.88
See application file for complete search history.

(56) References Cited

U.S. PATENT DOCUMENTS

| | | | | |
|---|---|---|---|---|
| 458,962 | A * | 9/1891 | Willershausen | A47B 13/16 108/26 |
| 1,029,709 | A * | 6/1912 | Norrlander | A47B 67/04 312/285 |
| 2,030,899 | A * | 2/1936 | Scurlock | A47G 23/08 211/144 |
| 2,042,637 | A * | 6/1936 | Scurlock | A47J 47/04 126/246 |
| D160,688 | S * | 10/1950 | Brock | 211/128.1 |
| 2,672,741 | A * | 3/1954 | Bernhardt | A47G 23/08 220/23.4 |
| D193,308 | S * | 7/1962 | Jackson | D7/501 |
| 3,111,095 | A | 11/1963 | Goodman | |
| 3,385,465 | A * | 5/1968 | Bliss | A47J 27/122 D7/615 |
| 3,851,599 | A | 12/1974 | Bridges | |
| 3,951,079 | A * | 4/1976 | Tolleson | A47F 5/02 108/94 |
| 3,972,419 | A * | 8/1976 | Short | A47G 23/08 211/131.1 |
| 4,483,455 | A * | 11/1984 | Prophet, Jr. | A47G 23/06 D7/614 |
| 4,775,055 | A * | 10/1988 | Morse | A47J 47/16 D6/682.2 |
| 4,844,243 | A * | 7/1989 | Stiles | A47F 3/14 426/119 |
| 4,953,696 | A * | 9/1990 | Huang | B43M 99/008 206/214 |
| 5,010,826 | A * | 4/1991 | Kudlac | A47B 13/16 297/188.2 |
| D325,281 | S * | 4/1992 | Jordan | D3/302 |
| 5,547,098 | A * | 8/1996 | Jordan | B25H 3/06 220/528 |
| 5,641,080 | A * | 6/1997 | Humphrey | A47B 49/004 211/163 |
| 5,732,847 | A * | 3/1998 | Caldi | A47G 19/065 294/146 |
| 5,784,952 | A * | 7/1998 | Liu | A47J 37/0781 219/214 |
| D422,840 | S * | 4/2000 | Hedlund | D7/553.6 |

(Continued)

*Primary Examiner* — Jennifer E. Novosad
(74) *Attorney, Agent, or Firm* — Kyle A. Fletcher, Esq.

(57) ABSTRACT

The lazy susan is configured for use with a plurality of foodstuffs. The lazy susan forms a plurality of containers that present the plurality of foodstuffs for serving. The lazy susan incorporates a primary bowl structure, a plurality of auxiliary bowl, and a slewing bearing. The primary bowl structure attaches to the slewing bearing. The plurality of auxiliary bowls removably attach to the primary bowl structure.

9 Claims, 6 Drawing Sheets

(56) References Cited

U.S. PATENT DOCUMENTS

| | | | | |
|---|---|---|---|---|
| 6,085,926 | A * | 7/2000 | Weiss | B63B 22/24 |
| | | | | 220/560 |
| 6,186,055 | B1 * | 2/2001 | DeMars | A47J 37/0781 |
| | | | | 219/214 |
| 6,206,493 | B1 * | 3/2001 | Sanchez-Levin | A47F 5/05 |
| | | | | 312/249.2 |
| 6,520,352 | B2 * | 2/2003 | Mondragon | A47F 5/02 |
| | | | | 211/144 |
| 6,557,368 | B1 * | 5/2003 | DeMars | F25D 31/006 |
| | | | | 62/530 |
| 6,796,441 | B2 * | 9/2004 | Tremblay | A47F 7/0071 |
| | | | | 211/74 |
| 6,796,443 | B2 * | 9/2004 | Lippman | A47F 5/05 |
| | | | | 211/163 |
| 7,007,813 | B2 * | 3/2006 | Yang | F25D 3/08 |
| | | | | 211/131.1 |
| 7,156,226 | B1 * | 1/2007 | Van Sickle | A47J 47/16 |
| | | | | 206/1.5 |
| 7,225,633 | B2 * | 6/2007 | DeMars | F25D 3/08 |
| | | | | 62/457.2 |
| D587,970 | S | 3/2009 | Zack et al. | |
| 8,544,390 | B1 * | 10/2013 | Bahnsen | F16B 12/26 |
| | | | | 248/349.1 |
| 8,915,391 | B2 * | 12/2014 | Radow | A47G 19/00 |
| | | | | 211/144 |
| 8,955,683 | B2 * | 2/2015 | Agababov | B65D 43/0212 |
| | | | | 206/514 |
| 9,902,526 | B2 * | 2/2018 | Hall | B65D 25/205 |
| D827,302 | S * | 9/2018 | Foley | D3/302 |
| D958,607 | S * | 7/2022 | Zhong | D7/600.4 |
| 2005/0029259 | A1 | 2/2005 | Famham | |
| 2005/0076817 | A1 * | 4/2005 | Boks | A47B 88/44 |
| | | | | 108/103 |
| 2008/0011697 | A1 * | 1/2008 | Berg | A47B 49/00 |
| | | | | 211/10 |
| 2011/0094983 | A1 * | 4/2011 | Burnside-Hall | B43M 99/001 |
| | | | | 211/164 |
| 2018/0271311 | A1 * | 9/2018 | Rabiai | A47G 23/06 |
| 2022/0396389 | A1 * | 12/2022 | Lee | B65D 25/10 |
| 2023/0084698 | A1 * | 3/2023 | Alsofi | A47G 23/06 |
| | | | | 206/557 |

* cited by examiner ic
LAZY SUSAN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of serving trays with detachable attachments. (A47G23/0633)

SUMMARY OF INVENTION

The improved lazy susan is configured for use with a plurality of foodstuffs. The improved lazy susan forms a plurality of containers that present the plurality of foodstuffs for serving. The improved lazy susan comprises a primary bowl structure, a plurality of auxiliary bowl, and a slewing bearing. The primary bowl structure attaches to the slewing bearing. The plurality of auxiliary bowls removably attach to the primary bowl structure.

These together with additional objects, features and advantages of the improved lazy susan will be readily apparent to those of ordinary skill in the art upon reading the following detailed description of the presently preferred, but nonetheless illustrative, embodiments when taken in conjunction with the accompanying drawings.

In this respect, before explaining the current embodiments of the improved lazy susan in detail, it is to be understood that the improved lazy susan is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the improved lazy susan.

It is therefore important that the claims be regarded as including such equivalent construction insofar as they do not depart from the spirit and scope of the improved lazy susan. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
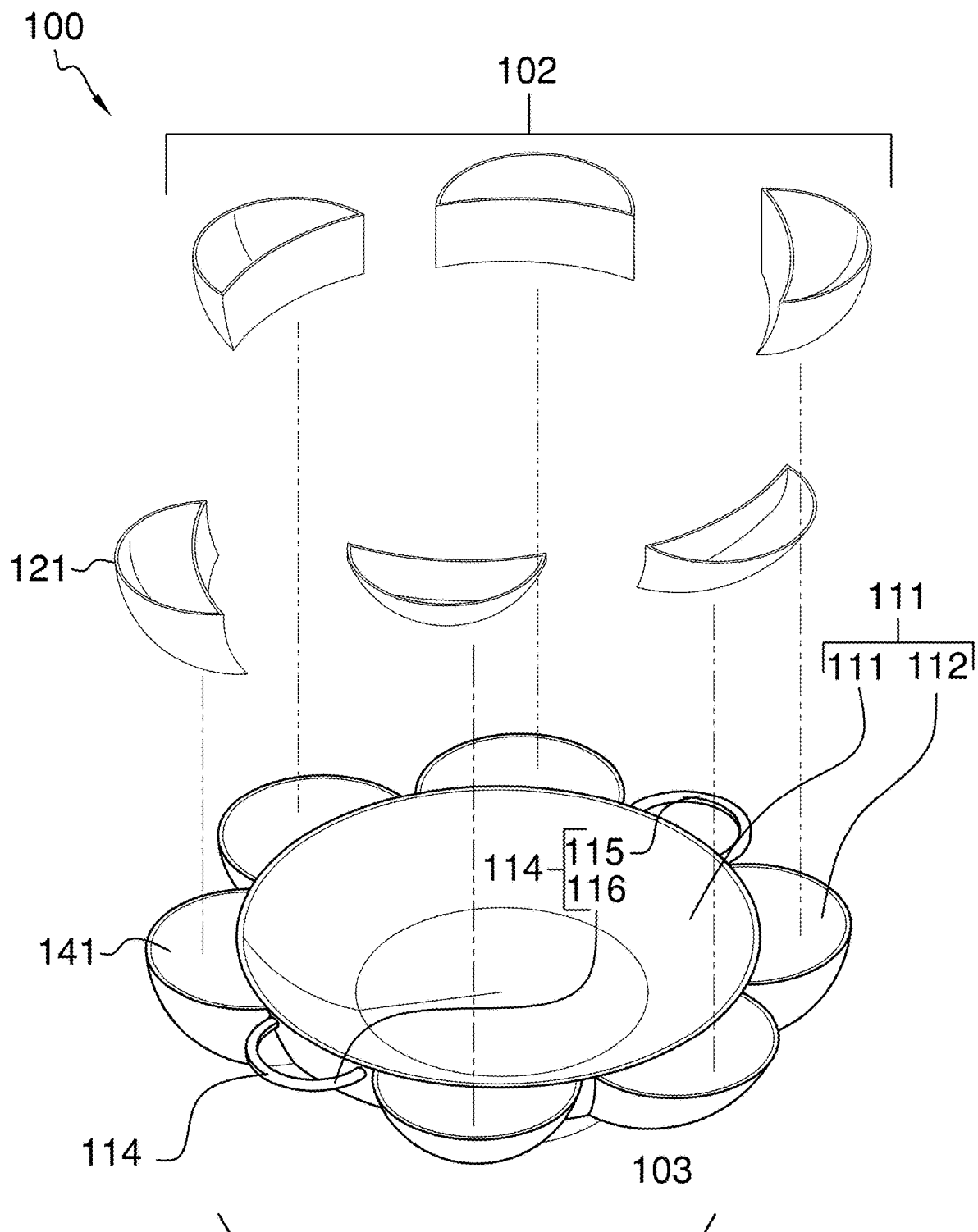
FIG. 1 is an exploded view of an embodiment of the disclosure.
Figure 2:
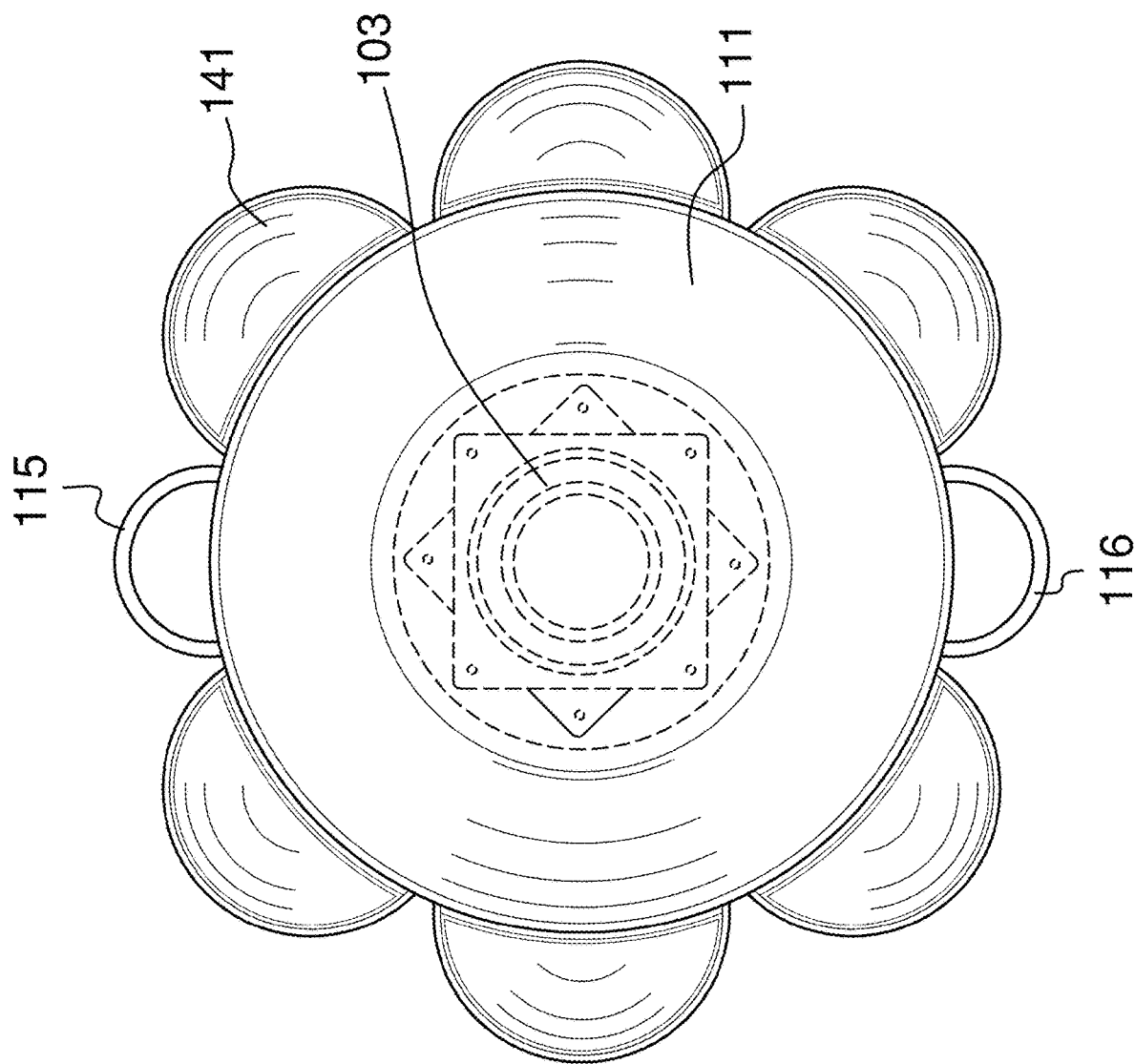
FIG. 2 is a top view of an embodiment of the disclosure.
Figure 3:
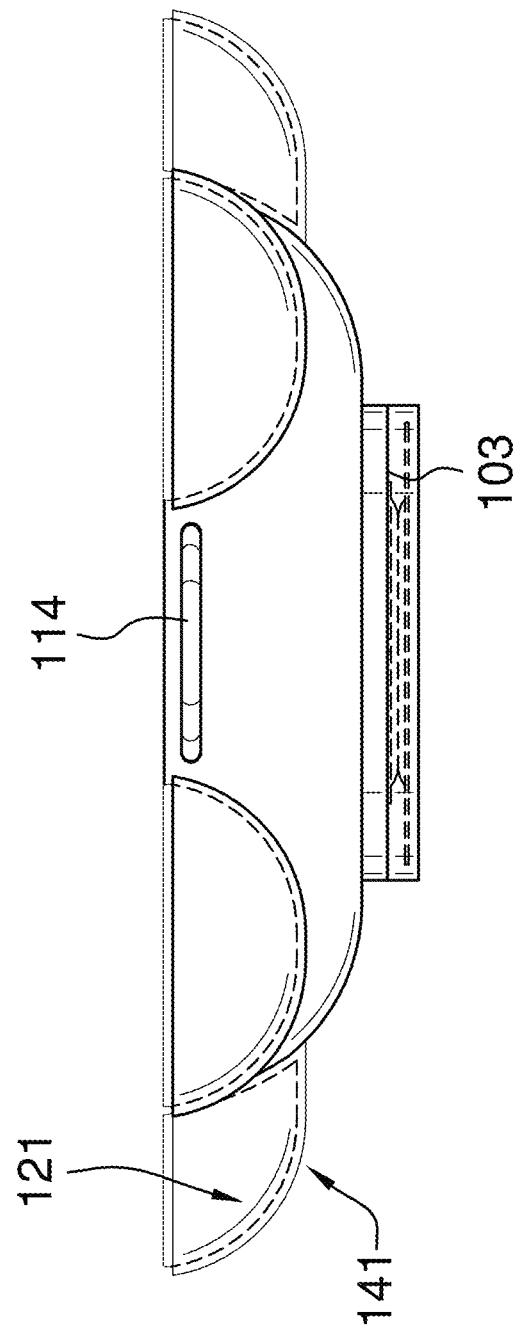
FIG. 3 is a side view of an embodiment of the disclosure.
Figure 4:
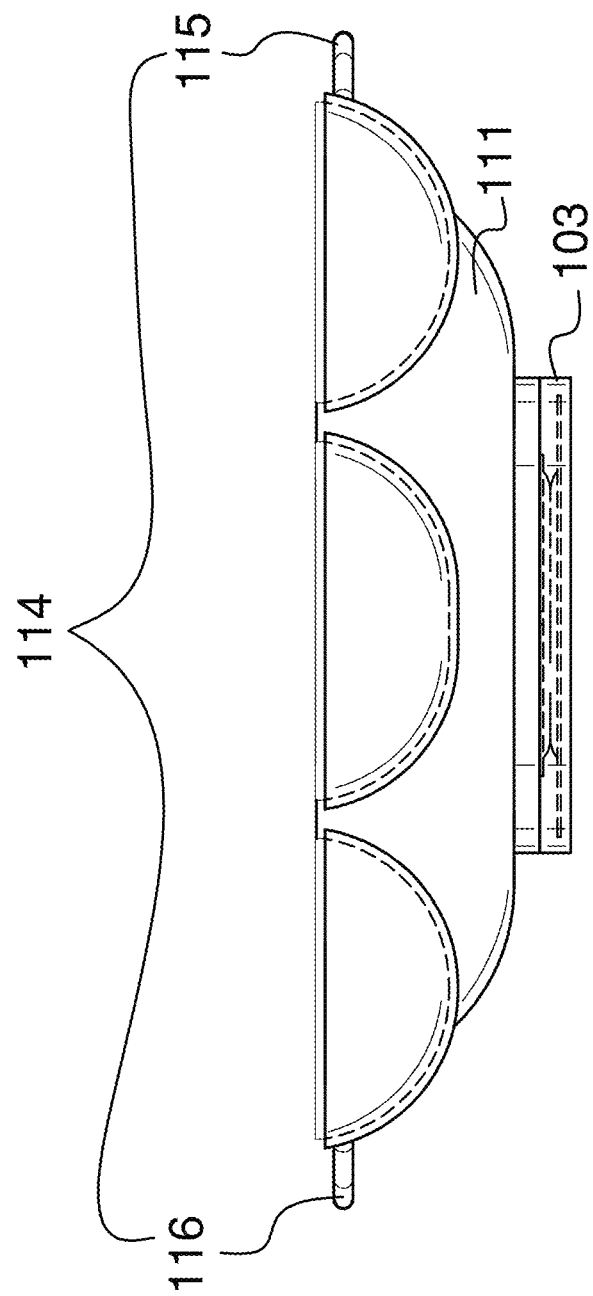
FIG. 4 is a front view of an embodiment of the disclosure.
Figure 5:
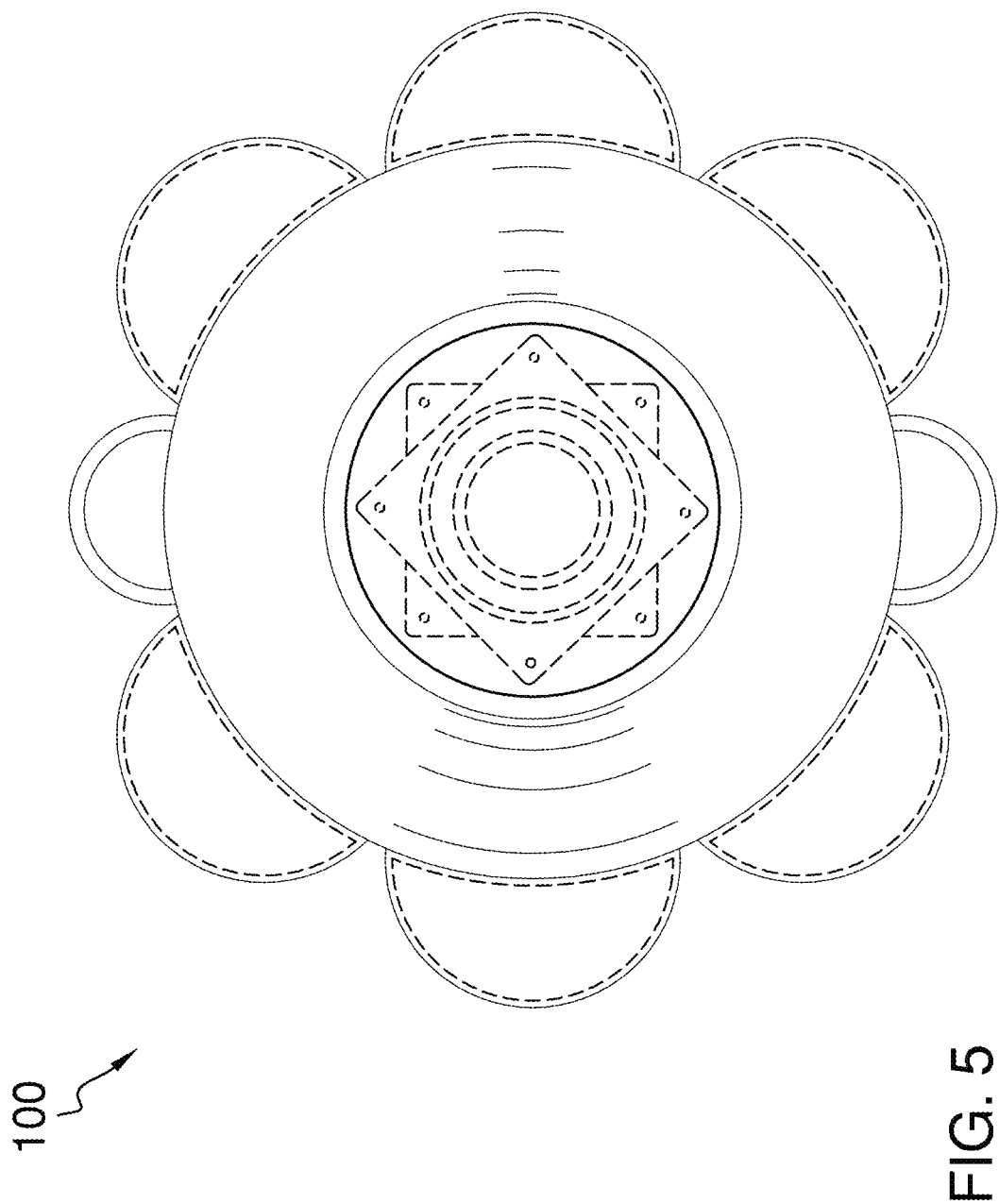
FIG. 5 is a bottom view of an embodiment of the disclosure.
Figure 6:
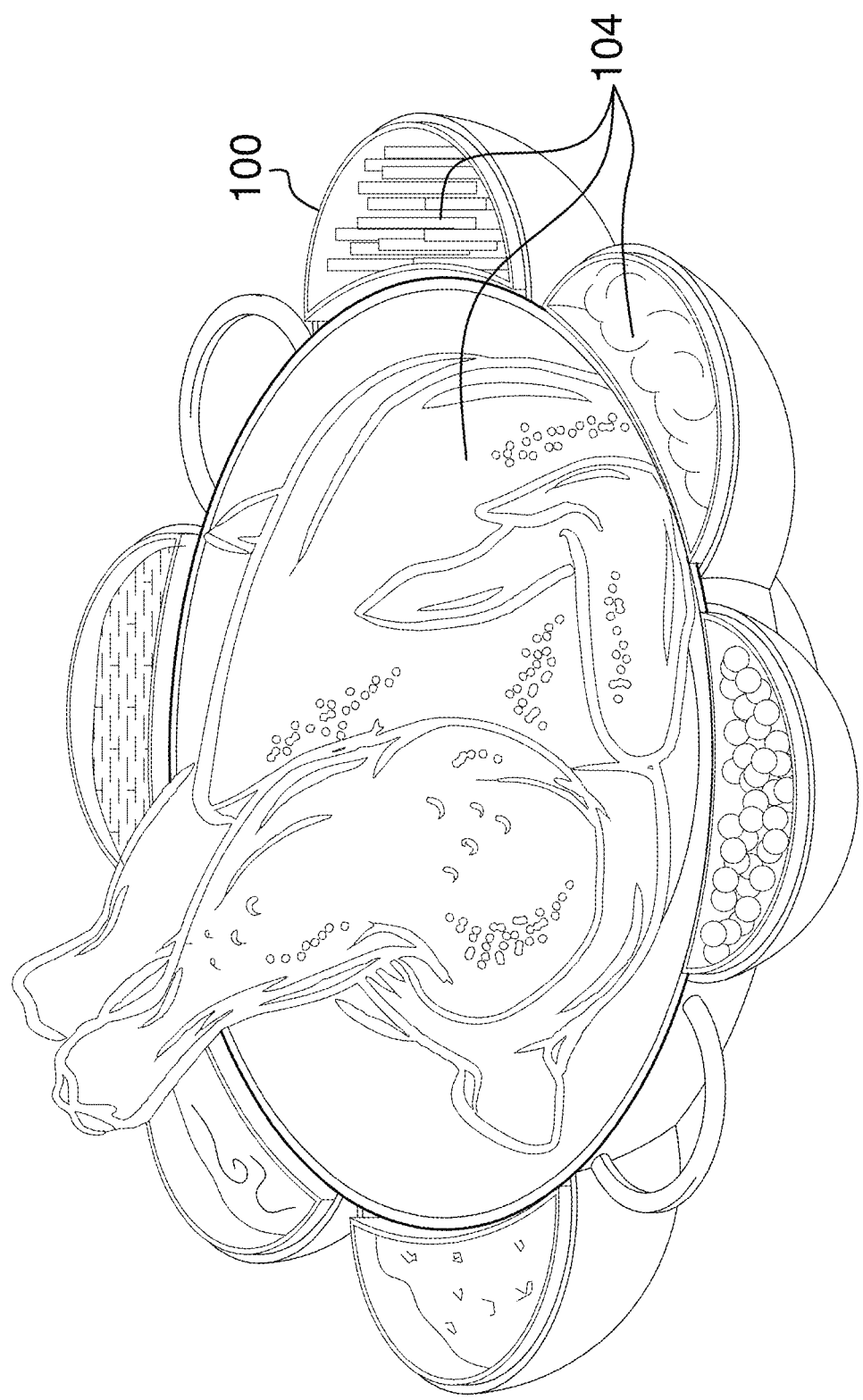
FIG. 6 is an in-use view of an embodiment of the disclosure.

Detailed reference will now be made to one or more potential embodiments of the disclosure, which are illustrated in FIGS. 1 through 6.

The improved lazy susan 100 (hereinafter invention) is configured for use with a plurality of foodstuffs 104. The invention 100 forms a plurality of containers that present the plurality of foodstuffs 104 for serving. The invention 100 comprises a primary bowl structure 101, a plurality of auxiliary bowls 102, and a slewing bearing 103. The primary bowl structure 101 attaches to the slewing bearing 103. The 14 plurality of auxiliary bowls 102 removably attach to the primary bowl structure 101.

Each individual foodstuff selected from the plurality of foodstuffs 104 is a foodstuff. Each selected individual foodstuff is presented for service in a bowl selected from the group consisting of: a) the primary pan structure 111; and, b) an individual auxiliary bowl 121 selected from the plurality of auxiliary bowls 102. The plurality of foodstuffs 104 comprises a collection of individual foodstuffs.

The slewing bearing 103 is a mechanical structure. The slewing bearing 103 is a rotating structure. The slewing bearing 103 is defined elsewhere in this disclosure. The slewing bearing 103 forms the inferior structure of the invention 100. The slewing bearing 103 forms a load path that transfers the loads of each individual foodstuff selected from the plurality of foodstuffs 104, the plurality of auxiliary bowls 102, and the primary bowl structure 101 to a horizontally oriented supporting surface.

The primary bowl structure 101 attaches to the slewing bearing 103 such that the primary bowl structure 101 transfers the loads of the plurality of foodstuffs 104 and the plurality of auxiliary bowls 102 to the slewing bearing 103. The slewing bearing 103 forms a pedestal structure that elevates the primary bowl structure 101 above the supporting surface. The slewing bearing 103 is a rotating structure. The primary bowl structure 101 mounts on the slewing bearing 103 such that the rotation of the slewing bearing 103 rotates the primary bowl structure 101.

The primary bowl structure 101 is a container. The primary bowl structure 101 is used to store and present one or more individual foodstuffs selected from the plurality of foodstuffs 104. The primary bowl structure 101 is a roughly pan shaped structure. The primary bowl structure 101 has a shape selected from the group consisting of a: a) a roughly spherical section shape; and, b) a roughly ellipsoidal section shape. Each individual auxiliary bowl 121 selected from the plurality of auxiliary bowls 102 removably attaches to the primary bowl structure 101. The primary bowl structure 101 comprises primary pan structure 111 and a plurality of pan mounts 112.

The primary pan structure 111 forms the primary structure of the invention 100. The primary pan structure 111 forms the primary structure of the primary bowl structure 101. The plurality of pan mounts 112 attaches to the primary pan structure 111. The plurality of auxiliary bowls 102 attaches to the primary pan structure 111. The slewing bearing 103 attaches to the primary pan structure 111. The primary pan structure 111 is a container. The primary pan structure 111 is used to store and present an individual foodstuff selected from the plurality of foodstuffs 104.

The primary pan structure 111 is a hollow structure. The primary pan structure 111 is a roughly pan shaped structure. The primary pan structure 111 has the shape of a structure selected from the group consisting of: a) a spherical section; and b) an ellipsoidal section. The primary pan structure 111 is the structure of the primary bowl structure 101 that rotates with the rotation of the slewing bearing 103.

The plurality of pan mounts 112 comprises a collection of individual pan mounts 141. Each individual pan mount 141 selected from the plurality of pan mounts 112 is a container. The selected individual pan mount 141 receives an individual auxiliary bowl 121 selected from the plurality of auxiliary bowls 102. Each selected individual auxiliary bowl 121 removably inserts into the selected individual pan mount 141.

Each selected individual pan mount 141 has a hollow structure. Each selected individual pan mount 141 is a roughly pan shaped structure. Each selected individual pan mount 141 has the shape of a structure selected from the group consisting of: a) a spherical section; and b) an ellipsoidal section. Each selected individual pan mount 141 permanently attaches to the lip structure of the open face of the rough pan structure of the primary pan structure 111. The selected individual pan mount 141 permanently attaches to the exterior surface of the primary pan structure 111. The open face of each selected individual pan mount 141 is located at the exterior lip structure of the open face of the primary pan structure 111.

In the second potential embodiment of the disclosure, the primary bowl structure 101 further comprises a handle structure 114. The handle structure 114 further comprises a first grip 115 and a second grip 116. The handle structure 114 forms a grip structure that is used to carry the invention 100. The first grip 115 is a loop grip that attaches to the exterior lip structure of the open face of the primary pan structure 111. The second grip 116 is a loop grip that attaches to the exterior lip structure of the open face of the primary pan structure 111. The second grip 116 is diametrically opposed to the first grip 115.

The plurality of auxiliary bowls 102 form a container structure. The plurality of auxiliary bowls 102 are used to store and present an individual foodstuff selected from the plurality of foodstuffs 104. The plurality of auxiliary bowls comprises a collection of individual auxiliary bowls 121.

Each individual auxiliary bowl 121 selected from the plurality of auxiliary bowls 102 has a hollow structure. Each selected individual auxiliary bowl 121 is a roughly pan shaped structure. Each selected individual auxiliary bowl 121 has an ellipsoidal crescent structure.

Each selected individual auxiliary bowl 121 is associated with an individual pan mount 141 selected from the plurality of pan mounts 112. Each selected individual auxiliary bowl 121 is geometrically similar to its associated individual pan mount 141. Each selected individual auxiliary bowl 121 removably attaches to the primary bowl structure 101 by inserting into its associated individual pan mount 141. The form factor of each selected individual auxiliary bowl 121 ensures that each selected individual auxiliary bowl 121 fits flush within its associated individual pan mount 141.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Associate: As used in this disclosure, the term associate is used to describe a relationship between a first object and a second object. The use of the term associated implies both: a) that the first object works with the second object in order to accomplish a task necessary for the implementation of the invention (such as joining two objects together); and, b) the relationship remains stable through the accomplishment of the task. By stable is meant that neither the first object or the second object are intended to be interchanged with a third object during the use of the invention.

Barrier: As used in this disclosure, a barrier is a physical obstacle that forms a boundary between a first space and a second space. The barrier prevents the passage of an object between the first space and the second space.

Bearing: As used in this disclosure, a bearing is a mechanical device that: 1) guides and limits the motion of a moving component relative to a fixed component; and, 2) reduces the friction between the moving component and the fixed component. A locking bearing is a bearing that can be locked such that the rotation or movements are secured into a fixed position until the locking bearing is subsequently unlocked.

Bifurcate: As used in this disclosure, to bifurcate means to divide an object or space into two pieces or segments.

Boundary Structure: As used in this disclosure, a boundary structure is a barrier that separates a first object from a second object such that the second object cannot damage the first object.

Bowl: As used in this disclosure, a bowl is a rounded hollow containment structure used to store foodstuffs, bulk solids, or other liquids.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Crescent: As used in this disclosure, a crescent is a two edged geometric shape formed from the overlapping of a second circle over a first circle. The diameter of the first circle and the diameter of the second circle may or may not be identical. The first circle and the second circle may or May not share a common center point. The crescent is formed by: 1) overlaying the second circle on the first circle such that two points of intersection are formed; 2) using the second circle as a negative space that removes the area and segment of the circumference of the first circle that is contained within the second circle, and 3) replacing the removed circumference of the first circle with the segment of the circumference of the second circle contained within the area of the first circle to form the second edge of the crescent. Within the scope of this definition an ellipse may be substituted for either (or both) of the first circle and the second circle to form an elliptical crescent. Further, within the scope of this definition either (or both) of the two intersection points may be rounded.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Ellipse: As used in this disclosure, an ellipse is a curve described by the equation $(x/a)^2 + (y/b)^2 = c$. When a=b, the ellipse forms a circle.

Ellipsoid: As used in this disclosure, an ellipsoid is a three-dimensional geometric surface through which all planar surfaces are from either circles or ellipses. An ellipsoid is a type of quadric surface. The equation for an ellipsoid is: $(x^2/a) + (y^2/b) + (z^2/c) = d$ wherein a, b, c, and d are 19 constants.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Flush: As used in this disclosure, the term flush is used to describe the alignment of a first surface and a second surface to form a single structure selected from the group consisting of a Euclidean plane and a non-Euclidean plane.

Foodstuff: As used in this disclosure, a foodstuff refers to an edible material that is used as food or a beverage.

Footprint: As used in this disclosure, a footprint is the measure of the surface area of a supporting surface that is occupied by an object.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Great Circle: As used in this disclosure, a great circle refers to the circle formed on a Euclidian plane that passes through the center of a sphere.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lip: As used in this disclosure, a lip refers to the region of the lateral face of a pan or tube structure that abuts the perimeter of the open face of the pan or tube structure. By abutting the perimeter of the open face is meant that the lip forms a brink with the surface that forms the perimeter of the open face. The lip of the interior surface of the pan structure is called the interior lip. The lip of the exterior surface of the pan structure is called the exterior lip. The region of the lateral face of a pan structure that abuts the perimeter of the closed face of the pan structure is called the brink lip.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protection Space: As used in this disclosure, a protection space is a space formed by a boundary structure. The boundary structure forms a protective barrier that protects objects outside the protection space from potential dangers from the contents enclosed by the protection space.

Radial: As used in this disclosure, the term radial refers to a direction that: 1) is perpendicular to an identified central axis; or, 2) projects away from a center point.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Rounded: A used in this disclosure, the term rounded refers to the replacement of an apex, vertex, or edge or brink of a structure with a (generally smooth) curvature wherein the concave portion of the curvature faces the interior or center of the structure.

Semi-sphere: As used in this disclosure, a semi-sphere is a structure formed in the shape of a half a sphere. Such a structure would be described as semispherical. The bifurcating surface of the semi-sphere formed by a great circle of the full sphere.

Slew: As used in this disclosure, to slew means to turn or rotate an object around a fixed point or axis.

Slewing Bearing: As used in this disclosure, a slewing bearing is a device that is used to rotate an object on a horizontal surface. Slewing bearings are typically load bearing structures. Slewing bearings are often called turntable bearings or a lazy susan bearing.

Spherical and Ellipsoidal Crescent. As used in this disclosure, the spherical crescent refers to a crescent structure where the first circle is replaced with a first sphere and the second circle is replaced with a second sphere. An ellipsoidal crescent refers to an elliptical crescent where either (or both) of the first sphere and the second sphere are replaced with an ellipsoid.

Elliptical and Spherical Section: As used in this disclosure, a spherical section refers one of the two objects formed by the bifurcation of a sphere by a plane that does not pass through the center of the sphere. The major section is the spherical section that contains the larger volume. The minor section is the spherical section that contains the smaller volume. A spherical section is commonly called a spherical cap. The term spherical section is also applied to a semi-spherical structure. An elliptical section is similar to a spherical section wherein the spherical structure is replaced with an ellipsoidal structure.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An improved A lazy susan comprising
a primary bowl structure, a plurality of auxiliary bowls, and a slewing bearing;
wherein the primary bowl structure attaches to the slewing bearing;
wherein the plurality of auxiliary bowls removably attach to the primary bowl structure;
wherein the lazy susan forms a plurality of containers that are configured to store a plurality of foodstuffs in a bowl selected from the group consisting of: a) the primary pan structure; and, b) an individual auxiliary bowl selected from the plurality of auxiliary bowls;
wherein the primary bowl structure mounts on the slewing bearing such that the rotation of the slewing bearing rotates the primary bowl structure;
wherein the primary bowl structure is a container configured to store one or more individual foodstuffs selected from the plurality of foodstuffs;
wherein each individual auxiliary bowl selected from the plurality of auxiliary bowls removably attaches to the primary bowl structure;
wherein the plurality of auxiliary bowls comprises a collection of individual auxiliary bowls;
wherein each individual auxiliary bowl selected from the plurality of auxiliary bowls has a hollow structure;
wherein each selected individual auxiliary bowl is a pan shaped structure;
wherein each selected individual auxiliary bowl has an ellipsoidal crescent structure.

2. The improved lazy susan according to claim 1
wherein the slewing bearing is a mechanical structure;
wherein the slewing bearing is a rotating structure;
wherein the slewing bearing forms the inferior structure of the lazy susan.

3. The lazy susan according to claim 2
wherein a primary bowl structure comprises primary pan structure and a plurality of pan mounts;
wherein the plurality of pan mounts attach to the primary pan structure.

4. The lazy susan according to claim 3
wherein the primary pan structure forms a primary structure of the primary bowl structure;
wherein the slewing bearing attaches to the primary pan structure.

5. The lazy susan according to claim 4
wherein the primary pan structure is a container;
wherein the primary pan structure is a hollow structure;
wherein the primary pan structure is a pan shaped structure;
wherein the primary pan structure is the structure of the primary bowl structure that rotates with the rotation of the slewing bearing.

6. The lazy susan according to claim 5
wherein the plurality of pan mounts comprises a collection of individual pan mounts;
wherein each individual pan mount selected from the plurality of pan mounts is a container;
wherein each selected individual pan mount receives an individual auxiliary bowl selected from the plurality of auxiliary bowls;
wherein each selected individual auxiliary bowl removably inserts into the selected individual pan mount.

7. The lazy susan according to claim 6 wherein each selected individual pan mount has a hollow structure;

wherein each selected individual pan mount is a pan shaped structure;

wherein each selected individual pan mount permanently attaches to a lip structure of the open face of the rough pan structure of the primary pan structure;

wherein the selected individual pan mount permanently attaches to an exterior surface of the primary pan structure;

wherein an open face of each selected individual pan mount is located at the exterior lip structure of the open face of the primary pan structure.

8. The lazy susan according to claim 7 wherein each selected individual auxiliary bowl is associated with an individual pan mount selected from the plurality of pan mounts;

wherein each selected individual auxiliary bowl is geometrically similar to its associated individual pan mount;

wherein each selected individual auxiliary bowl removably attaches to the primary bowl structure by inserting into its associated individual pan mount;

wherein a form factor of each selected individual auxiliary bowl ensures that each selected individual auxiliary bowl fits flush within its associated individual pan mount.

9. The lazy susan according to claim 8 wherein the primary bowl structure further comprises a handle structure;

wherein the handle structure further comprises a first grip and a second grip;

wherein the handle structure forms a grip structure that is used to carry the lazy susan;

wherein the first grip is a loop grip that attaches to the exterior lip structure of the open face of the primary pan structure;

wherein the second grip is a loop grip that attaches to the exterior lip structure of the open face of the primary pan structure;

wherein the second grip is diametrically opposed to the first grip.

\* \* \* \* \*